United States Patent

[11] 3,600,931

| [72] | Inventors | Anton Albert Bartel<br>Grafelfing;<br>Horst Geissen, Munich, both of, Germany |
|---|---|---|
| [21] | Appl. No. | 872,082 |
| [22] | Filed | Oct. 29, 1969 |
| [45] | Patented | Aug. 24, 1971 |
| [73] | Assignee | Dow Corning Corporation<br>Midland, Mich. |
| [32] | Priority | Mar. 10, 1967 |
| [33] | | Germany |
| [31] | | P 19 12 100.7 |

[54] APPARATUS FOR TESTING LUBRICANTS WITH REGARD TO ROLLING BORE FRICTION ON BEARING BALLS
6 Claims, 3 Drawing Figs.

[52] U.S. Cl. ................................................ 73/10,
73/7
[51] Int. Cl. .................................................. G01n 3/56,
G01n 33/30
[50] Field of Search............................. 73/10, 9, 7

[56] References Cited
UNITED STATES PATENTS

| 2,108,948 | 2/1938 | Smith | 73/7 |
| 3,041,867 | 7/1962 | Knudsen | 73/9 |
| 3,113,449 | 12/1963 | Morgan | 73/10 |
| 3,178,928 | 4/1965 | Howe | 73/10 |

*Primary Examiner*—Louis R. Prince
*Assistant Examiner*—Daniel M. Yasich
*Attorneys*—Robert F. Fleming, Jr., Laurence R. Hobey and Howard W. Hermann ABSTRACT: Apparatus for testing effectiveness of lubricants in rolling bore friction applications where bearing balls are subjected to both rolling and sliding contact with races. One of a pair of spaced curved bearing races of like radius are made reciprocably pivotable about an axis distant from the races with respect to the other race. This causes the ball between the races to shift with both rolling and sliding motion. Results are observed in the form of wear on the ball and races.

INVENTORS
HORST GEISSEN
ANTON A. BARTEL

INVENTORS
HORST GEISSEN
ANTON A. BARTEL

ATTORNEY

APPARATUS FOR TESTING LUBRICANTS WITH REGARD TO ROLLING BORE FRICTION ON BEARING BALLS

BACKGROUND OF THE INVENTION

The invention relates to apparatus for testing lubricants with regard to rolling bore friction on bearing balls which run in a pair of grooves in two apaced adjacent machine parts.

Testing machines for oil-based and grease-based lubricants are known, by means of which the behavior of workpieces which are moved relative to one another under high stresses can be investigated. For example, the sliding or rolling friction on bodies moved relative to one another are tested, with the bodies either moving towards one another in one direction or carrying out an oscillating movement relative to one another. With the known testing machines, the loads on the relatively moving surfaces of the test pieces and/or the speed at which these pieces move relative to one another can be varied. In other known testing machines, the effects of dynamic forces, for example vibrations, on the bearing surfaces can be tested. In tests on lubricants, the working temperature, the time taken for certain surface damage to occur on the moved bodies (i.e., abrasion of these bodies), and the coefficient of friction are measured. At the end of the test, the appearance of the bearing surface is examined.

These known testing machines are not suitable for testing lubricants where combined kinetic stresses occur, such as appear in the case of rolling bore friction where sliding and rolling are superimposed on one another. With rolling bore friction, the lubricant is stressed in two directions simultaneously in the boundary phase. The known testing machines can only test the load in one direction. It is particularly important to test lubricants under rolling bore friction conditions because novel designs, for example of motor vehicles, use constant-velocity joints in which a kind of rolling bore friction occurs, i.e., superimposed sliding and rolling friction. Since, because the lubricant is stressed in two directions, the temperature under rolling bore friction is substantially higher than under stress due to pure sliding friction or pure rolling friction, abrasion occurs more under rolling bore friction than under the latter two types of friction.

SUMMARY OF THE INVENTION

The primary object of the invention is to provide apparatus for testing lubricants where rolling bore friction occurs, and more particularly apparatus with which all the parameters measured by known testing apparatus can be determined.

In apparatus according to the invention, each of the two machine parts has a curved groove and the bases of these grooves lie in parallel planes separated from one another by one bearing ball diameter, and one groove is pivotable relative to the other about an axis parallel to and eccentric relative to the axes of curvature of the grooves through an adjustable pivoting angle. Preferably, two annular grooves having equal diameters are used, one being fixed and the other being pivoted backwards and forwards through an angle of, for example, ±10° about a pivoting axis eccentric relative to its own axis.

If the curvature of the grooves and their situation relative to one another are suitably chosen, it is possible, by pivoting one groove relative to the other, to reproduce any motion of a bearing ball situated between grooves, this ball both rolling in the direction of its circumference and turning about an axis which extends through the points of contact between the ball and the groove surfaces. Preferably, the pivot angle is such that the ball rolls round a given arc in the grooves and at the end of this arc adopts a rolling rotary motion, so that, during each pivoting movement, both purely rolling friction and rolling bore friction occur and the behavior of the bearing material in these two areas can be compared. The advantage of the invention is, therefore, that any motion of a bearing ball can be reproduced and that comparison with purely rolling friction can be carried out on the same workpiece.

Preferred apparatus according to the invention has at least three pairs of thrust bearing races which are arranged at equal angular distances of approximately 120° from one another and in each of which one thrust bearing race is pivotable relative to the other about an axis parallel to and eccentric relative to the axes of all the thrust bearing races. The thrust bearing races in a given pair may have the same or different diameters, and preferably all the pivotable thrust bearing races are attached to a plate which is pivoted backwards and forwards about the pivoting axis as a unit. When the apparatus is in use, a bearing ball is inserted between the two thrust bearing races in each pair, so that in the event of compressive stress in the direction of the axes of the thrust bearing races this stress is distributed uniformly to the three bearing balls. Preferably, the apparatus has a pivoting mechanism which carries out a reciprocating movement, the pivoting angle being adjustable by simple means, e.g., an adjustable cam. Means, for example a hydraulic cylinder, may be provided so that the holding devices for the pairs of thrust bearing races can be urged onto one another with adjustable pressure.

BRIEF DESCRIPTION OF DRAWINGS

Other objects and attendant advantages of the invention will become obvious to those skilled in the art from a consideration of the following description of preferred embodiments when read in connection with the following drawings wherein.

DESCRIPTION OF PREFERRED EMBODIMENTS

Figure 1:
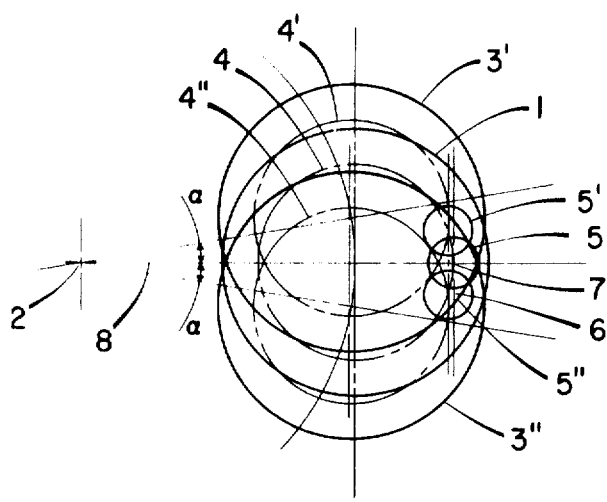
FIG. 1 illustrates schematically the principles of the invention.

Referring now to the drawings wherein like reference numerals designate like parts throughout the figures, there is shown in FIG. 1 a schematic diagram illustrating the principles of the invention. The thick solid circle 1 in FIG. 1 represents a fixed thrust bearing race. Thin solid circles represent two limit positions 3', 3" of another thrust bearing race, pivotable about an axis 2 and having the same diameter as the race 1. Circles 4, 4', 4" drawn with chain lines indicate the base of the groove in the pivotable thrust bearing race in the position in which this race conceals the fixed race 1, and in the two limit positions 3', 3". The chain-line circle 4, therefore, also represents the geometrical position of the base of the groove in race 1.

The bearing ball is shown in its central position 5 and its two limit positions 5', 5". When the pivoting motion of the race pivotable about the axis 2 relative to the fixed race 1 brings the ball out of its position 5 in either direction, it at first carries out a rolling motion in the direction 6 about its center 7, rolling on its equator which is perpendicular to the pivoting radius. Since, in accordance with the invention, the pivoting movement is about a radius 8 substantially greater than the radius of the two thrust bearing grooves, the ball, as a result of the pivoting motion, tries to roll round a circular path having the radius 8. It is prevented by the greater curvature of the thrust bearing races, which are moving relative to one another, and since the ball is compelled to move along the grooves in these races, it not only rolls round a path having the same radius 8 as the pivoting motion, but also simultaneously turns about on axis substantially parallel to the pivoting axis 2 and passing through the center of the ball, with the result that the ball carries out a rolling and turning motion. The bases of the race grooves, which are exactly superjacent in the position of symmetry, intersect one another during pivoting of the races about the axis 2, at an angle which increases with the pivoting angle $a$. The greater the angle at which the groove bases of the two races intersect one another in a plan view, the greater the proportion of the rotary (turning) motion of the ball in the overall motion and the smaller the proportion of the rolling movement. From a certain pivoting angle $a$, which depends on the curvature of the grooves and the diameter of the ball, therefore, rolling bore friction occurs, which increases with the angle $a$.

Figure 3:
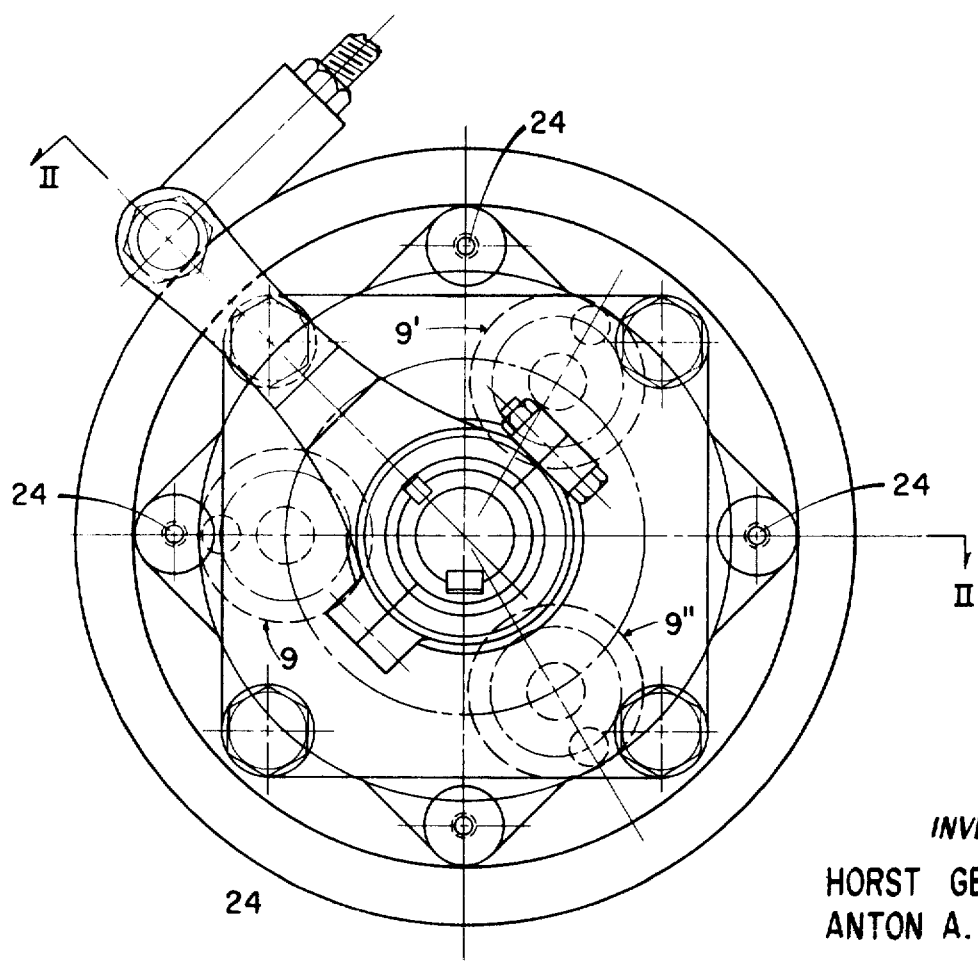
FIG. 3 shows a section along a line III—III in FIG. 2 with the position of the test bearings superimposed thereon.
Figure 2:
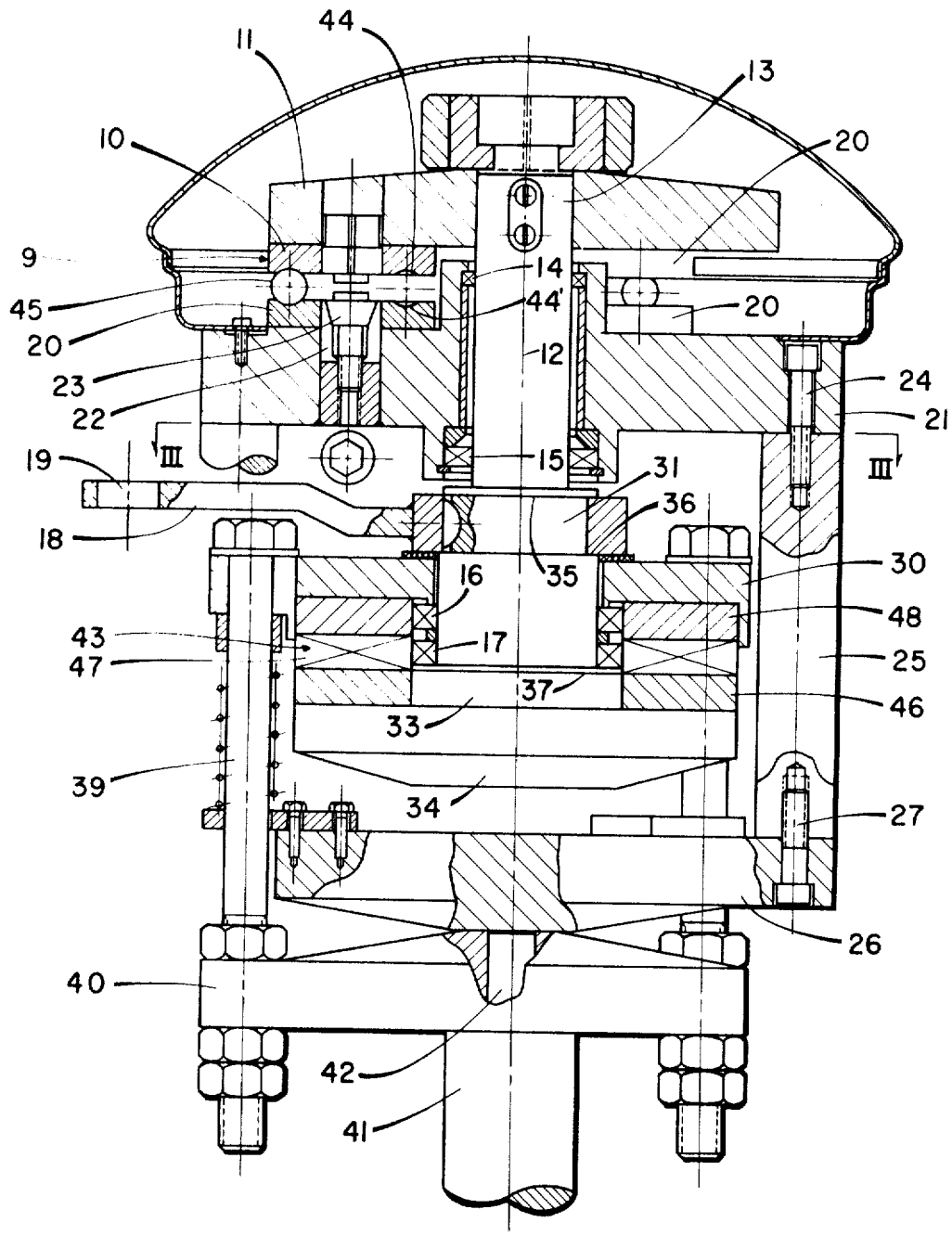
FIG. 2 represents a longitudinal section through apparatus embodying the invention.

FIGS. 2 and 3 illustrate a practical embodiment of apparatus according to the invention, applying the principle explained with reference to FIG. 1. The section along which FIG. 2 is taken is designated II—II in FIG. 3. Three pairs 9, 9', 9'' of thrust bearing races are arranged at an angular distance of 120° from one another. The upper thrust bearing races 10 are fixed to a plate 11 pivotable about an axis 12. This plate 11 is rigidly attached to a rotor or column 13, mounted in bearings 14–17 in such a way that it is rotatable and axially displaceable. The column 13, with the upper thrust bearing races 10, is pivoted by means of a lever 18, having a bore 19 to receive the pin of a variable length connecting rod shown fragmentarily in (FIG. 3). This connecting rod is connected, for example, to a driven crank so that the lever 18 and therefore the column 13 and plate 11 can be made to move backwards and forwards through an angle adjustable by changing the length of the connecting rod. Driving devices of this kind are well known and will not, therefore, be described in detail.

The lower thrust bearing races 20 are screwed fast onto a plate 21, for example, by means of a screw with a conical head 23 and a tapered socket 22. Screws 24 screw the plate 21 onto columns 25, fixed in turn by screws 27 to a lower plate 26.

The plates 21, 26 and the columns 25 are rigidly attached to the machine chassis and form part of the stator of the apparatus. The shaft 13 has shaft portions 31–34, each of which is greater in diameter than the previous shaft portion, so that shoulders 35–38 are formed. Between the plate 30 and the platelike shaft portion 34 lies a rolling thrust bearing 43 with bearing races 46, 48 and rollers 47. The plate 30 is also attached by screws 39 to a plate 40, fixed to a hydraulic cylinder 41. The piston 42 of this cylinder bears on the plate 26. When the piston 42 is subjected to hydraulic pressure, it presses on the plate 26 and tends to push the plates 26, 40 apart, applying a force corresponding to the pressure in the cylinder 41. This pressure is transmitted to the thrust bearing races 10, 20, so that the balls 45 in the bearing grooves 44, 44' can be subjected to pressure. The hydraulic cylinder 41, piston 42, plate 40, screws 39, plate 30 and thrust bearing race 48 form a clamp, by means of which the plates 34, 26 and with them the plates 21, 11 can be urged onto one another in the direction of the pivoting axis 12. If the rotor swings backwards and forwards about the axis 12, the bearing balls 45 and the grooves 44, 44' in the thrust bearing races 10, 20 are subjected to abrasion, which depends on the pivoting angle $a$ and therefore on the extent of the rolling bore friction and the pressure in the hydraulic cylinder, and also on the lubricant being tested. By testing various lubricants under identical conditions, comparisons of effectiveness can be made by observing the wear on the balls and races. It should be noted that the above-described embodiment provides for testing three different materials at any given time.

Obviously, modifications of the above-described embodiment will become obvious to those skilled in the art from a reading of the foregoing description. It is to be understood, therefore, that the invention can be practiced other than as specifically described.

That which is claimed is:

1. Apparatus for testing lubricants with regard to rolling bore friction on bearing balls, comprising:

a pair of machine parts each having a curved groove in a substantially planar surface thereof, at least one bearing ball adapted to be coated with the lubricant to be tested, means for mounting said machine parts and said bearing ball in a manner such that the bases of the grooves lie in parallel planes separated from one another by said bearing ball, and means for reciprocating by pivoting one of said parts relative to the other about an axis which is spaced from but parallel to the axes of curvature of the grooves, whereby said bearing ball is forced by the walls of said grooves to alternatingly shift position relative to both of said grooves in a sliding and rolling fashion.

2. Apparatus as defined in claim 1 wherein said grooves constitute thrust bearing races, and three such races are arranged in spaced relationship at equal angular distances from one another on each of said pair of machine parts, a bearing ball being positioned in contact with both races of each corresponding pair of races of said pair of machine parts.

3. Apparatus as defined in claim 2 wherein both the thrust bearing races in each pair have the same diameter.

4. Apparatus as defined in claim 3 wherein the pivot radius is greater than any thrust bearing race radius.

5. Apparatus as defined in claim 4 wherein all of the pivotable thrust bearing races are attached to a plate mounted for reciprocation through an adjustable angle by means of a crank drive.

6. Apparatus as defined in claim 5 including hydraulic means for applying pressure to said bearing balls by said races.